Patented Feb. 4, 1936

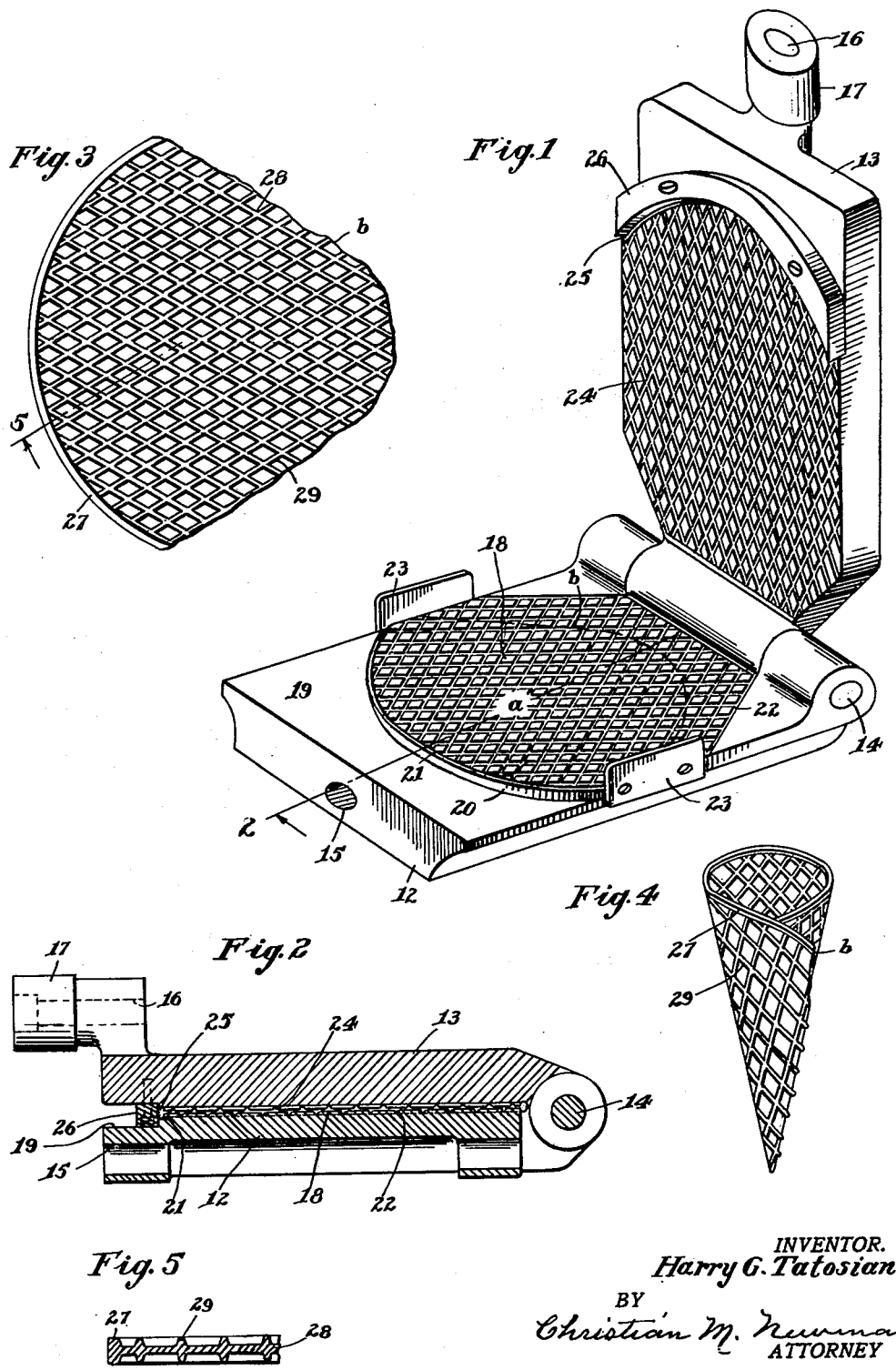

2,029,448

UNITED STATES PATENT OFFICE 2,029,448

CAKE BAKING IRON

Harry G. Tatosian, Bridgeport, Conn., assignor, by mesne assignments, to Ice Cream Cone Machine Corporation, New York, N. Y., a corporation of New York Application January 29, 1932, Serial No. 589,567

3 Claims. (Cl. 53—10)

My present invention refers to a new form of baking iron adapted to be used in pastry cake baking machines and more particularly to that class of pastry cakes which are rolled, while yet warm and pliable, into a cone shape to form a rolled ice cream cone of improved design and quality.

The baking iron comprising my invention and shown in the accompanying drawing is adapted to be used in several improved classes of cone cake baking machines, particularly the type of machine shown and described in my prior Patent #1,540,041, it being possible to substitute irons embodying my invention for those heretofore used in that machine and as shown and described in said patent.

The more modern types of irons used in the production of rollable cone cakes, comprise two plate members hingedly connected together and adapted to be separated one from the other or opened and closed during the travel of the baking iron and in process of forming a baked cake.

All rolled ice cream cone cakes now made are objectionable since they possess a ragged and very fragile top edge portion which breaks in handling and shipping and are also very liable to break when the ice cream is placed therein.

An object of the invention therefore is to provide an improved form of baking iron, comprising two plates hingedly connected together and each having a novel design of baking surface that in part includes a circular groove around one end portion of the baking areas, and which surfaces co-operate in baking relation when the plates are closed, and further to form a series of grooves in said plates one end of which intersects with said circular groove. By this means I am able to produce an improved form of cake from which cones of improved design can be rolled and which will largely overcome the objections above noted as to the old type of rolled cones.

In the use of this class of baking irons in the type of machine referred to, the batter is deposited on the lower plate, yet it is not until the upper plate is lowered on the batter that it is spread between the two, to assume its proper shape and dimension. By depositing a uniform quantity of the batter each time upon the iron, substantially uniform sizes of cakes may be produced, any variations which there may be with the use of my improved iron, is distributed around the raw edge of the cake where it can readily be worked in, when the cake is rolled into a cone.

The plates are so constructed that the production of cakes having a uniform reinforced edge portions that form the top edge of the cone, is assured.

An embodiment of the invention is shown in the accompanying drawing and will be hereinafter more fully described and finally pointed out in the claims hereto appended.

Upon the accompanying drawing, similar characters of reference will be found to denote like or corresponding parts throughout the several figures, and of which:

Fig. 1 shows a perspective view of a baking iron, in an open position, constructed in accordance with my invention.

Fig. 2 shows a longitudinal section, through the iron shown in Fig. 1, in a closed position, and taken on line 2 of said Fig. 1.

Fig. 3 shows a plan view, on an enlarged scale, of a pastry ice cream cone cake as produced by my baking iron illustrated in Figs. 1 and 2.

Fig. 4 shows an elevational perspective view of an ice cream cone as it appears when rolled from the forms of cone cake produced by my improved cake baking iron, and Fig. 5 shows a detail cross section, on an enlarged scale, taken on line 5 of Fig. 3 through the circular edge portion of the cake.

Referring in detail to the characters of reference marked on the drawing, 12 represents the lower plate member and 13 the upper plate member which form the baking iron and which are hingedly connected together along their rear edge portions through the medium of a pin 14. The lower plate is provided with a longitudinal hole 15 that serves for its connection to a baking machine and by means of which the iron is conveyed along with a series of similar irons through the baking oven of the machine. The upper plate is provided with a projected stud 16 which carries a roller 17 that engages and rides upon a guide track of the machine, not shown, as the chain of baking units are carried through the machine and whereby the upper plate is raised from the lower plate for the removal of a baked cake, to receive the batter and to lower said upper plate upon the batter and lower plate preparatory to a baking operation.

It will be noticed that the baking area 18 formed in the top of the lower plate is slightly above the outer end surface 19 of the lower plate and that a circular edge portion 20 is formed along the outer edge portion of the baking surface in a way to form a circular shaped edge that constitutes the limits of the forward end of the baking area of the lower plate.

A circular shoulder 21 is formed in the baking area 18 of the lower plate immediately adjacent to said circular edge 20, said shoulder extending from one said edge of the plate to the other. Grooves 22 are also formed in the top surface and form a part of the baking area, one end of the majority of these grooves leading to and communicating with the before mentioned circular shoulder 21.

This lower plate is further provided on its opposite side edges with upwardly projected guides 23, which serve as a closure for the side edges of the baking chamber, when the two plates are laid together, and to prevent the escape of dough from the iron.

The upper plate like the lower plate is provided with a series of generally longitudinally disposed grooves 24 that communicate at their outer ends with an arcuate shoulder 25 that is located adjacent to the inner circular wall of a member 26 of the iron that serves, when the iron is closed, to overlap the edge portion 20 of the lower plate so that the shoulder 25 of the upper plate will be brought to register with the shoulder 21 of the lower plate, and whereby the two plates combined form a circular enlargement that results in the formation of a circular rib 27 on one edge portion only of the cake 28, as shown in Fig. 3. In this connection it will also be seen that the transverse grooves in the face of the plates form like ribs on opposite sides of the cake which connect with circular ribs 29.

These transverse grooves like those of the lower plate are arranged in a generally longitudinal direction extending for the most part from the forward portion and circular groove end of the plate to the rear so that when the batter which is deposited at approximately the location indicated by a and the upper plate lowered thereon, the dough will be spread in a way to first fill the outer edge portions of the face of the iron to form the re-inforced edge of the cake and then worked back to form the raw edges b, see Fig. 3, and as is indicated by dotted line on lower plate in Fig. 1.

In this respect of course it will be understood that the said circular portion 26 strikes the top face of the lower plate in close proximity to the edge 20 in a manner to prevent any escape of batter along this edge and at the same time limits the closing movement in a way to form a baking area or chamber therebetween sufficient to produce a cake of the desired thickness.

Having thus described my invention what I claim and desire to secure by Letters Patent is:—

1. A cake baking device comprising two irons hingedly connected together and adapted to close in parallel and spaced relation to one another, opposed grooved baking faces on the respective irons, a portion of each of said baking faces being bounded by an arcuate shoulder, the respective shoulders being adapted to register with one another when the baking irons are closed together, and means carried on one of said baking irons adjacent the shoulder thereof and adapted when the baking irons are closed to rest adjacent the shoulder of the other baking iron, whereby to provide for the formation within the space defined among the arcuate shoulders and the aforesaid means, of a reenforcing bead upon a cake formed when batter is disposed between the baking irons and the latter closed together.

2. A cake baking device comprising two irons hingedly connected together and adapted to close in parallel and spaced relation to one another, opposed grooved baking faces on the respective irons, aligned arcuate shoulders formed on a portion of each of said baking faces, and means adapted when said baking irons are closed together to rest adjacent the arcuate shoulders of the baking faces on the respective irons, thereby to provide for the formation within the space defined among the arcuate shoulders and the aforementioned means, of a reenforcing bead upon a cake formed when batter is disposed between the baking irons when closed together.

3. In a cake-baking device comprising two irons hingedly connected together and carrying cooperating grooved baking faces for forming a batter-cake, means for providing a reenforcing bead on said batter cake, said means comprising aligned arcuate shoulders along a portion of the respective baking faces adapted to register with one another in spaced relationship and an arcuate bar adapted to be disposed adjacent the respective shoulders when the irons are closed.

HARRY G. TATOSIAN.